TUBULAR THERMOELECTRIC ARRAY

Filed April 5, 1962 4 Sheets-Sheet 1

INVENTORS
Arthur T. Bassett, Jr.
Richard S. Gaugler
Keith E. Jenkins
BY
Carl A. Stickel
THEIR ATTORNEY INVENTORS
Arthur T. Bassett, Jr.
Richard S. Gaugler
Keith E. Jenkins
BY
Carl A. Stickel
THEIR ATTORNEY INVENTORS
Arthur T. Bassett, Jr.
Richard S. Gaugler
Keith E. Jenkins
BY
Carl A. Stickel
THEIR ATTORNEY INVENTORS
Arthur T. Bassett, Jr.
Richard S. Gaugler
Keith E. Jenkins
BY
Carl A. Stickel
THEIR ATTORNEY United States Patent Office 3,272,659
Patented Sept. 13, 1966

3,272,659
TUBULAR THERMOELECTRIC ARRAY
Arthur T. Bassett, Jr., Richard S. Gaugler, and Keith E. Jenkins, Dayton, Ohio, assignors to General Motors Corporation, Detroit, Mich., a corportion of Delaware
Filed Apr. 5, 1962, Ser. No. 185,302
2 Claims. (Cl. 136—203)

This invention pertains to refrigerating apparatus and more particularly to thermoelectric arrays and methods of making thermoelectric arrays.

To effectively accomplish the heating or cooling of a large space by thermoelectric apparatus, it is necessary to provide many junctions so arranged that the heating junctions transmit heat to a space to be heated and the cold junctions remove heat from a space to be cooled.

Since only a small voltage is necessary to cause a thermoelectric effect at each junction, it is desirable to connect in series as many junctions as possible. This has the further advantage that, if a sufficient number are connected in series, a step-down transformer from a 115 volt alternating current power supply can be eliminated and only rectifiers and a capacitor or a choke coil is required. The use of thermoelectric arrays of many junctions has been restricted by their high cost.

It is an object of this invention to provide a many junction, thermoelectric array in which the hot and cold junctions are segregated and aligned and which can be rapidly made by mass production methods at a low cost.

It is another object of this invention to provide a simple, low cost method of making thermoelectric arrays having many junctions in which simple machinery and cutting tools and processes can be used to advantage.

It is another object of this invention to provide a many junctioned, thermoelectric array in which the parts can be formed, joined and assembled by simple, rapid, low cost processes which minimize handling and are capable of being performed automatically.

These and other objects are attained in the forms shown in drawings in which, in a first form, a thin flat narrow strip of a metal conductor, such as copper or aluminum, is wrapped helically in spaced relation around a substantially square mandrel to form a long square-shaped helix. The ends of the strip are connected to terminals mounted upon a plastic rod extending through the center of the strip after it is removed from the mandrel. The assembly is then placed in the mold and the interior thereof filled with an electrical and heat insulating, foam plastic resin. After removal from the mold, a slot is milled in each of two opposite sides to form two series of spaced parallel skewed conductor strips on opposite sides of the resin. These slots are filled by the plasma jet process with a mass of solidified crystalline thermoelectric material. The "P" type thermoelectric material is applied on one side and the "N" type on the opposite side bonded to the ends of the strips remaining after the cutting of the slots. As an alternative, a long bar of "P" type thermoelectric material may be soldered by the plasma arc process in the groove on one side while a long bar of the "N" type thermoelectric material may be soldered in the groove on the opposite side by the plasma arc process.

Following this, the thermoelectric material is severed in substantial alignment with the spaces between the conductor strips by a gang-type milling operation in which the axis of gang-type miller is skewed relative to the axis of the assembly at substantially the same angle as the strips are skewed relative to the axis of the assembly. As an additional alternative, separate pieces of "P" type thermoelectric material may be placed in the groove on one side and soldered to the adjacent ends of the strips; while on the opposite side, the separate pieces of "N" type material are soldered in between the ends of the strips.

In another form, a square tube of electrical conductor metal, such as copper or aluminum, of considerable length is filled with electrical and heat insulating foam. Thereafter, grooves are cut longitudinally by a milling cutter in the opposite sides. The grooves are filled in any one of the manners previously described, that is, by a continuous filling by the plasma arc process of "N" and "P" materials on the opposite sides or soldering in long bars of "N" and "P" type material on opposite sides. The conductor and the thermoelectric material is cut into a helix by the skewed, gang milling process. Also, individual pieces of "P" and "N" material may be inserted and bonded on opposite sides as preivously described. Terminals are then connected to the ends of the strip to complete the array.

In another form, two long U-shaped pieces of electrical conductor metal having outwardly turned flange portions have bonded in between their flange portions on opposite sides the "P" type thermoelectric bar and the "N" type thermoelectric bar. These may be soldered in place by the plasma arc process. As an alternative, the plasma arc process may be used to directly apply the "P" type thermoelectric material in the form of powder between one of the sets of flanges while the "N" type thermoelectric material is applied in the form of a powder through the plasma arc process between the flanges on the opposite side. The interior may be filled with the foamed, heat and electrical insulating, plastic material before or after the bonding of the "P" and "N" type thermoelectric material. The outer surface, including the conductor metal and the thermoelectric material thus formed, may then be cut by skewed gang milling cutters into a square helix. The ends of the assembly are then connected to electrical conductors.

As an alternative, after being cast onto the electrical and heat foam insulating material, the electrical conductors in the form of the U-shaped pieces are first cut by the skewed milling cutters into parallel spaced skewed conductor strips. Thereafter, the individual pieces of "P" type thermoelectric material are bonded between the ends of the strip portions on one side and the "N" type thermoelectric pieces are bonded between the end portions of the strip on the opposite side to complete the structure. The end portions of the strip are then connected to electrical conductors.

Further objects and advantages of the present invention will be apparent from the following description, reference being had to the accompanying drawings wherein preferred embodiments of the present invention are clearly shown.

Figure 1:
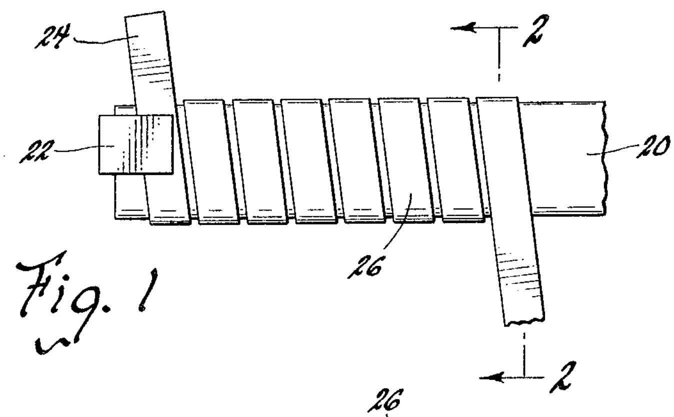
FIGURE 1 is a plan view illustrating the helical wrapping of an electrical conductor strip on a square mandrel.
Figure 2:
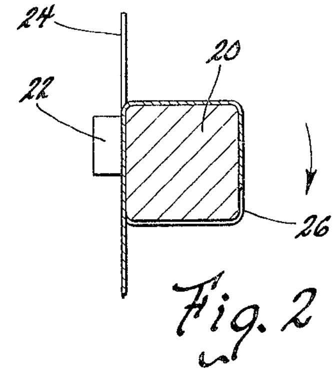
FIGURE 2 is a transverse sectional view taken along the line 2—2 of FIGURE 1.

The thermoelectric arrays, according to the present invention, are illustrated as the product of the processes or methods illustrated to make the same. Referring now to the drawings and more particularly to FIGURE 1, there is illustrated a square shaft, rotatable mandrel supported in a cantilever arrangement 20 which is rotated at a suitable speed. At the unsupported end, the mandrel 20 is provided with a clamp 22 for clamping the end portion 24 of a thin, narrow, long strip 26 of electrical conductor metal, such as copper or aluminum, which is started and fed at such a rate as to make an angle of about 7° with the axis of the mandrel 20. This assures the wrapping of the strip 26 in a square helix upon the surface of the mandrel with a spacing or gap of about $\frac{1}{32}$ of an inch between each of the turns or possibly slightly more.

After a sufficient length of the strip 26 is fed onto the mandrel 20 to make as long a thermoelectric array as is desired, the strip 26 is removed from the mandrel 20 and a nylon or other plastic rod 30 is passed through the center of the strip 26 longitudinally and is provided with terminals 32 and 34 fitting as caps on the ends of the rod 30. The end 24 of the strip 26 is then bent and fastened and bonded to the terminal 32 while the opposite end 36 is bent inwardly and bonded to the second terminal

Figure 3:
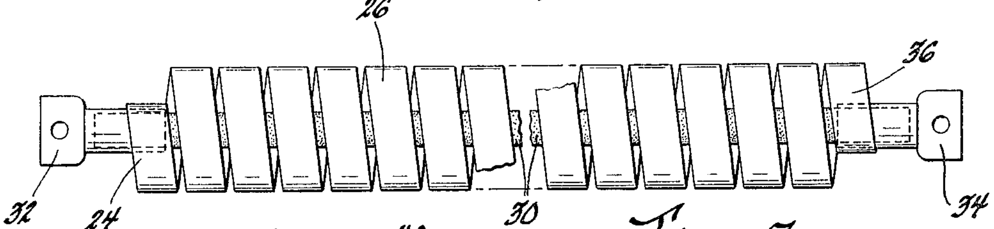
FIGURE 3 is a plan view showing the completed strip with the ends connected to electrical terminals attached to the ends of a plastic rod extending through the center of the assembly.

34. These end portions 24 and 36 serve to hold the terminals 32 and 34 as well as the rod 30 in proper position along the axis of the strip 26. To provide a suitable support for the coiled strip 26, the assembly shown in FIGURE 3 is placed in a vertical mold 38 shown in FIGURES 4 and 5. Suitable components capable of reacting to form an electrical and heat insulating polyurethane foam are supplied through the supply pipes 40 and 42 separately under the control of the valves 44 and 46 to the mixing chamber 48. The mixture resulting is discharged through the discharge pipe 50 into the space inside the strip 26 within the mold 38. Within the mold 38, the components react to form the electrical and heat insulating foam which fills the space within the strip 26 and joins the assembly in a substantially rigid unitary structure in which the foam serves the purpose of heat and electrical insulation as well as the unifying element.

Figure 7:
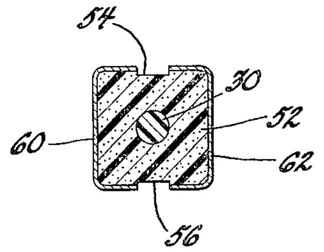
FIGURE 7 is a transverse vertical section of the assembly taken along the line 7—7 of FIGURE 6 showing the completed slots on opposite sides of the assembly.

After this foamed insulation material 52 sets, the entire assembly is removed from the mold 38 and slots 54 and 56 are cut longitudinally along two opposite sides by a conventional milling cutter 58. These slots 54 and 56 separate the strip 26 into two series 60 and 62 of spaced parallel, skewed, U-shaped metal connector strips as shown in FIGURES 7 and 8.

Figure 8:
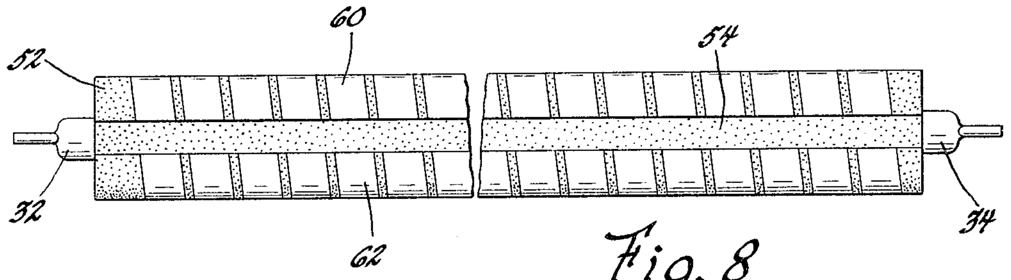
FIGURE 8 is a top view of the assembly showing the completed slots extending from end to end.
Figure 9:
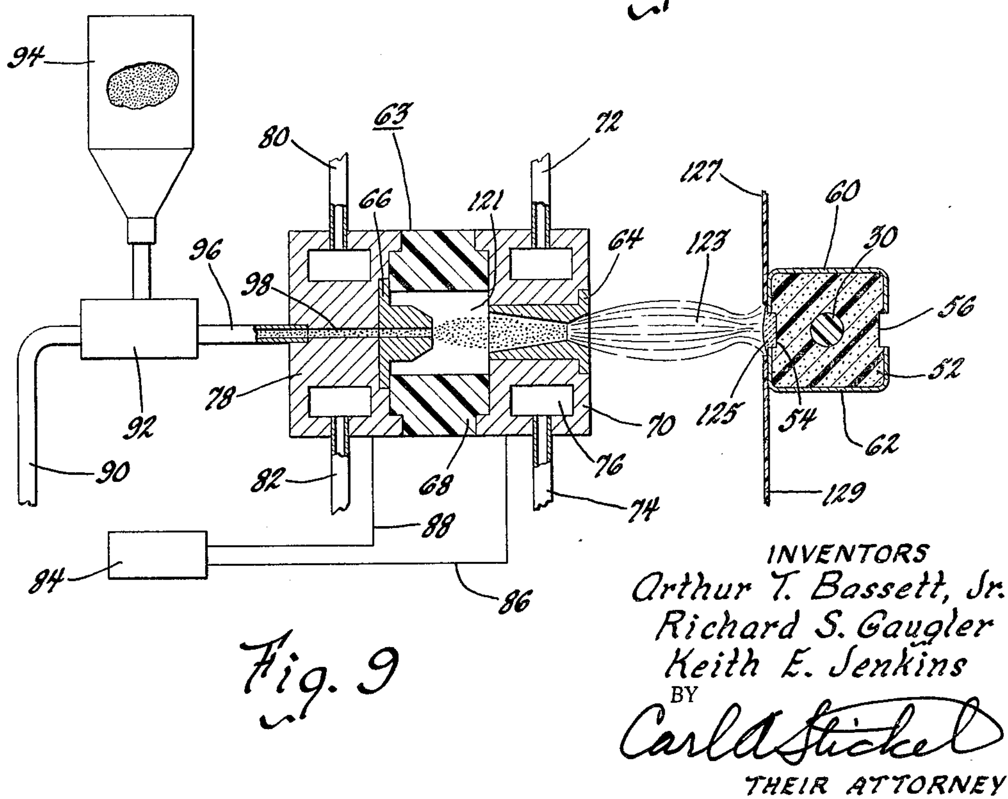
FIGURE 9 is a vertical sectional view illustrating the deposit of the continuous mass of one of the thermoelectric materials in powder form in one of the milled slots.
Figure 10:
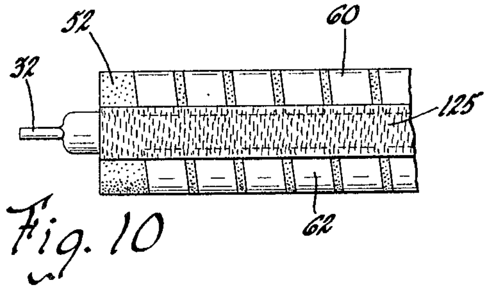
FIGURE 10 is a fragmentary plan view showing the continuous mass of thermoelectric material deposited in the groove by the step shown in FIGURE 9.

In the next step of the process, the assembly shown in FIGURE 8 is moved parallel to the groove 54 or 56 as the thermoelectric material is deposited in the grooves. As is shown in FIGURE 9, this is done by the plasma jet apparatus and process. Any suitable form of plasma jet may be used. As one specific example, there is shown in FIGURE 9 a plasma jet apparatus 63 including a front replaceable nozzle 64 forming the positive electrode and rear forwardly projecting negative electrode 66 which are insulated from each other by the housing 68 of electrical insulating material. A front cooling jacket 70 surrounds the front nozzle 64 and has a water inlet 72, a water outlet 74 and a water passage 76 within, connecting the water inlet 72 and the water outlet 74. A rear water jacket 78 is provided behind the rear electrode 66. A direct current supply 84 has its positive terminal connected by the conductor 86 to the water jacket 70 which is in electrical conducting relationship with the front nozzle 64. The power source 84 has its negative terminal connected by the conductor 88 to the rear water jacket 78 which is in electrical connection with the rear electrode 66. The direct current power supply 84 should have a potential greater than 20 volts and an output greater than 100 amperes sufficient to provide a high intensity arc between the electrodes 66 and 64.

An inert gas, such as argon, is supplied through a supply conduit 90 to the mixing chamber 92. Thermoelectric powder is supplied from the supply container 94 to the mixing chamber 92 where the inert gas and the powder mix and are conducted through the supply conductor 96 and the passage 98 extending through the rear water jacket 78 and the rear electrode 66 to the electric arc chamber 121 within the insulating member 68. The front electrode 64 has a venturi-shaped passage connecting with the chamber 121. For laying "P" type material 125 in the groove 54, the container 94 is charged with granular powder having a fineness of about 180 mesh containing fifty percent bismuth telluride and fifty percent antimony telluride. The plasma jet 123 not only heats and deposits the "P" type solidified crystalline thermoelectric material 125 in the groove 54 but it also bonds the "P" type thermoelectric material to the adjacent ends of the connectors 60 and 62. Upper and lower shields 127 and 129 are provided for shielding the assembly excepting for the space adjacent the groove 54 and the parts immediately adjacent thereto. The assembly shown in FIGURE 8 is moved parallel to the groove 54 in front of the plasma jet 123 until a sufficient deposit of the "P" type thermoelectric material is provided.

This plasma jet 63 may be used for applying the "N" type solidified crystalline thermoelectric material to the groove 56 on the opposite side of the assembly. The container 94 would be emptied and refilled with granular "N" type thermoelectric material. Instead of this, at the same time as the filling of the groove 54 the groove 56 may be filled by providing a duplicate plasma jet on the opposite side of the assembly shown in FIGURE 8. In this event, the container corresponding to the container 94 would be filled with "N" type thermoelectric granular powder, such as, for example, powder composed of ninety percent bismuth telluride and ten percent antimony telluride doped with copper bromide in the amount of between .25 and .3 percent.

Figure 13:
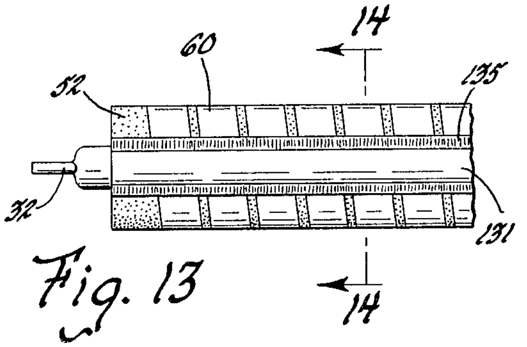
FIGURE 13 is a fragmentary top view illustrating a long bar of half-rounded thermoelectric material in the groove soldered to the severed ends of the strip portions by the plasma arc process.
Figure 14:
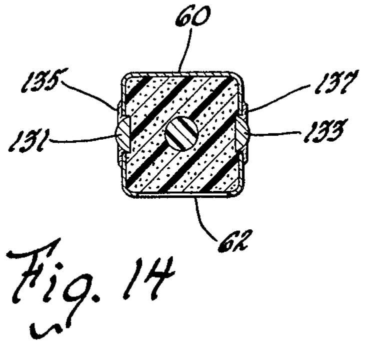
FIGURE 14 is a transverse vertical sectional view taken along the line 14—14 of FIGURE 13.

As an alternative to the deposit of solidified thermoelectric material in the grooves 54 and 56, as shown in FIGURES 13 and 14, a long bar of half-round thermoelectric material such as the bar of "P" type material 131 and the bar of "N" type material 133 are soldered to each of the connectors 60 and 62 by any suitable soldering process. Particularly, the solder may be deposited by moving the assemblies parallel to their axis relative to the plasma jet or flame spray gun; also, various forms of electrical soldering processes may be used, if desired, to apply the solder 135 and 137 to connect the connectors 60 through the bars 131 and 133 to the connectors 62. Any suitable solder may be used, such as a 40/60 tin lead solder or an 88% tin, 12% indium solder may be used, if desired.

Figure 12:
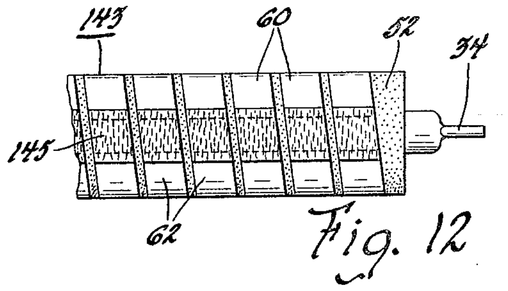
FIGURE 12 is a fragmentary top view of the assembly following the milling showing the severed thermoelectric material.
Figure 11:
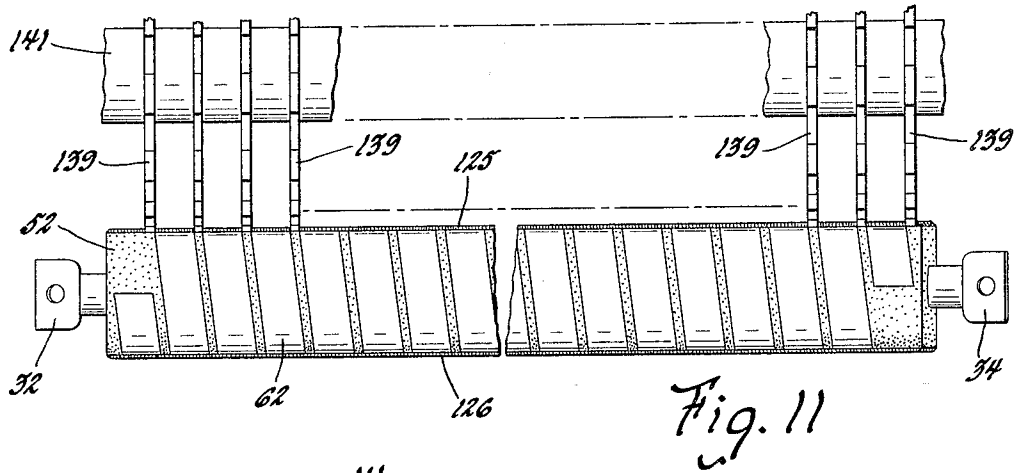
FIGURE 11 is a view in elevation showing the skewed, gang milling operation for cutting the thermoelectric material in alignment with the spaces between the electrical conductors strip portions.

After the "P" type thermoelectric material 125 has been deposited in the groove 54 and the "N" type thermoelectrical material 126 has been deposited in the groove 56 by the process shown in FIGURE 9, these thermoelectric materials 125 and 126 are cut in a skewed, gang-type milling process in alignment with the spaces between the connectors 60 and 62 as shown in FIGURE 11. A series of equally spaced milling cutters 139 having a spacing equal to the width of the connectors are arranged on the shaft 141 to make cuts in the "P" and "N" thermoelectric material 125 and 126 in alignment with the spaces between the connectors 60 and 62. This is accomplished by arranging that the axis of the assembly is arranged at the same angle to the axis of the shaft 141 as the connectors 60 and 62 are skewed relative to a perpendicular to the axis of the assembly. This results in a completed thermoelectric array, such as is illustrated in FIGURE 12, in which the individual pieces of thermoelectric material 145 on opposite sides of the array, and the connectors 60 and 62 are connected in the proper order with the "P" and the "N" pieces alternating in between the terminals 32 and 34.

This provides a thermoelectric array arranged in such a manner that it can be easily processed since the connectors 60 and 62 are all arranged in alignment and all of the "P" thermoelectric pieces 145 and the "N" thermoelectric pieces on the opposite side of the array are arranged in alignment. This makes it possible to devise simple jigs, fixtures and other tools to make it possible to more readily manufacture these thermoelectric arrays and, in particular, provides a design appropriate for their manufacture by automatic machinery.

Figure 15:
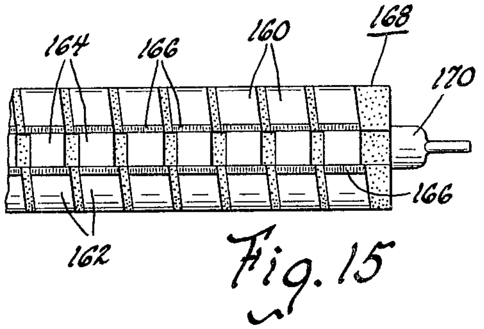
FIGURE 15 is a fragmentary top view of the modified form of the assembly wherein individual pieces of a thermoelectric material are soldered in between the severed ends of electrical conductor strip arranged in alignment with the axis of the assembly for fast assembly and soldering.

In FIGURE 15, a modified form is shown in which the skewed connectors 160 and 162 are connected by individual pieces 164 of "P" type thermoelectric material soldered by the solder 166 in place between the adjacent ends of the connectors 160 and 162 on one side of the assembly. The "N" type thermoelectric pieces are similarly soldered between the ends of the connectors 160 and 162 on the opposite side of this assembly 168. This assembly or thermoelectric array 168 has terminals 170 at the opposite ends connecting with the end connectors in the array. The interior contains heat and electrical insulating foam resin as in the previously described forms. This form is likewise appropriate for large scale production by automatic and semiautomatic machinery.

Figure 6:
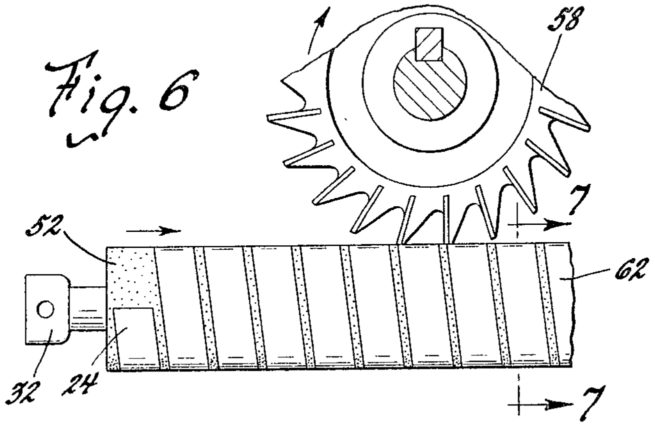
FIGURE 6 is a view in elevation showing the milling of a slot in one side of the assembly.
Figures 16, 17, 18, 19, 20, 21, 22, 23:
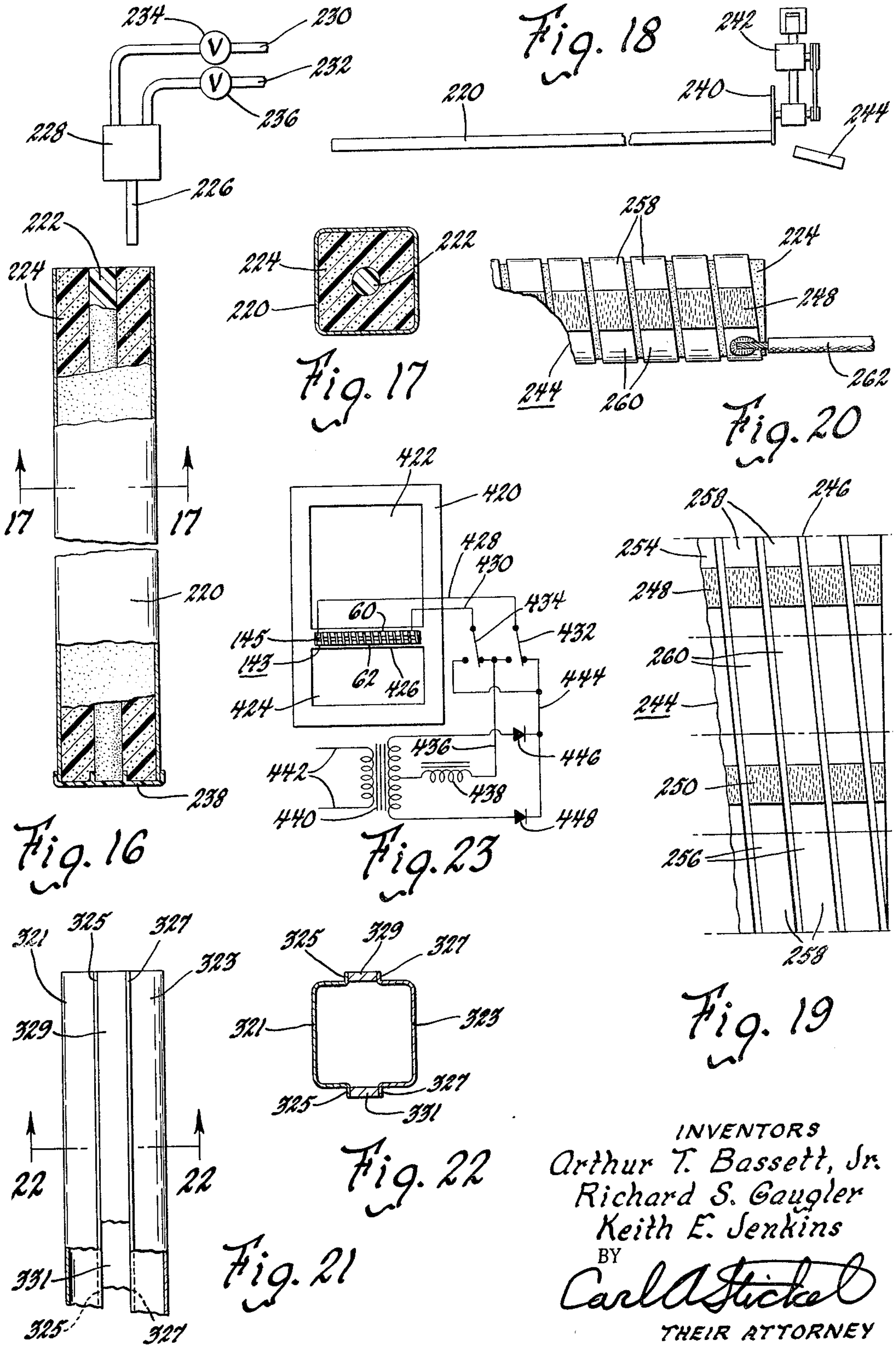
FIGURE 16 is a view in elevation showing a square tube of electrical conductor metal being filled with electrical and heat insulating foam resin.
FIGURE 17 is a transverse horizontal sectional view taken along the line 17—17 of FIGURE 16.
FIGURE 18 is a view in elevation showing the cutting of the filled tube into shorter lengths of uniform length.
FIGURE 19 is a development illustrating a portion of one of the cut portions of the tubing after it has been gang milled into a square helix by the skewed milling process illustrated in FIGURE 11 on the four sides.
FIGURE 20 is a top view of a fragment of the completed thermoelectric array illustrated in FIGURE 19.
FIGURE 21 is a view in elevation of another form of conductors and thermoelectric bars prior to the cutting operations.
FIGURE 22 is a transverse horizontal sectional view taken along the line 22—22 of FIGURE 21.
FIGURE 23 is a view in elevation of a refrigerated storage and warming cabinet containing a thermoelectric array constructed according to this invention and connected to a suitable power supply illustrated diagrammatically.

In FIGURES 16 and 17, the manufacture of the connectors is begun by filling a long square tube 220 of electrical conductor metal with a nylon rod 222 of similar length and heat and electrical insulating foam resin from the supply nozzle 226 which is fed from the mixing chamber 228. The components for forming the foam resin 224 are supplied through the supply conduits 230 and 232 under the control of the valves 234 and 236 to the mixing chamber 228. A cap 238 may be provided to close the bottom of the square tube 220 during the filling operation. After the foamed electrical and heat insulation 224 has set and cooled, the tube 220 is cut into the desired lengths 244 by the cutter 240 driven by the electric motor 242 as shown in FIGURE 18. Following this, each of the pieces 244 are cut by the skewed, gang milling process illustrated in FIGURE 11 on all four sides arranged so that the cuts on each face connect with the cuts on the adjacent faces so that the cut 246 extends as a square helix throughout the tubing of the piece 244 so as to form a continuous conductor from one end to the other of the piece 244. Either before or after this skewed milling operation, the grooves 248 and 250 are milled in the opposite faces 254 and 256 as illustrated in FIGURE 6 and in the development of FIGURE 19. In the development of FIGURE 19, the corners of the square tubing are illustrated by the dot and dash lines. After this, the grooves 248 and 250 are provided with thermoelectric material as illustrated in FIGURE 9 or as illustrated in FIGURES 13 and 14 or as illustrated in FIGURE 15.

As an alternative, this process may be arranged so that, either immediately after the tube 20 is filled with the resin 224 or after the pieces 244 are cut as shown in FIGURE 18, the tube 220 or the pieces 244 may be milled on opposite sides to provide the grooves 248 and 250 after which these grooves 248 and 250 are filled with "P" and "N" thermoelectric material, respectively, by either the process illustrated in FIGURE 9 or the bar and solder process illustrated in FIGURES 13 and 14. After this, the skewed milling operation illustrated in FIGURE 11 is employed to provide the skewed cutting of the tubing of the pieces 244 and the "P" and "N" thermoelectric material, as illustrated in FIGURE 19. This forms each of the connectors 258 and 260 and connects the individual "P" and "N" thermoelectric sections 248 and 250 alternately between the connectors 258 and 260. The electrical supply conductors, such as the conductor 262, may be soldered directly to the end connectors 258 and 260. This form likewise is appropriate for mass production tools and procedures and for automatic machinery.

In FIGURES 21 and 22, the connectors are formed out of two channel-shaped pieces 321 and 323 of electrical conductor metal, such as copper or aluminum. The flanges 325 and 327 of these pieces 321 and 323 are located adjacent each other and are turned outwardly as shown. If formed of copper, these pieces 321 and 323 may be tinned. Set between the flanges 325 and 327 on opposite sides are the "P" type thermoelectric strip 329 and the "N" type thermoelectric strip 331. These strips may be made of the alloys previously referred to as the "P" and "N" thermoelectric material. The flanges 325 and 327 may be bonded to the strips 329 and 331 by electric resistance heating or any other suitable type of quick heating. If the pieces 321 and 323 are aluminum, a suitable aluminum brazing process may be used. After this, the interior of the hollow square tubing so formed may be filled with plastic, electric and heat insulating foam resin.

Figure 4:
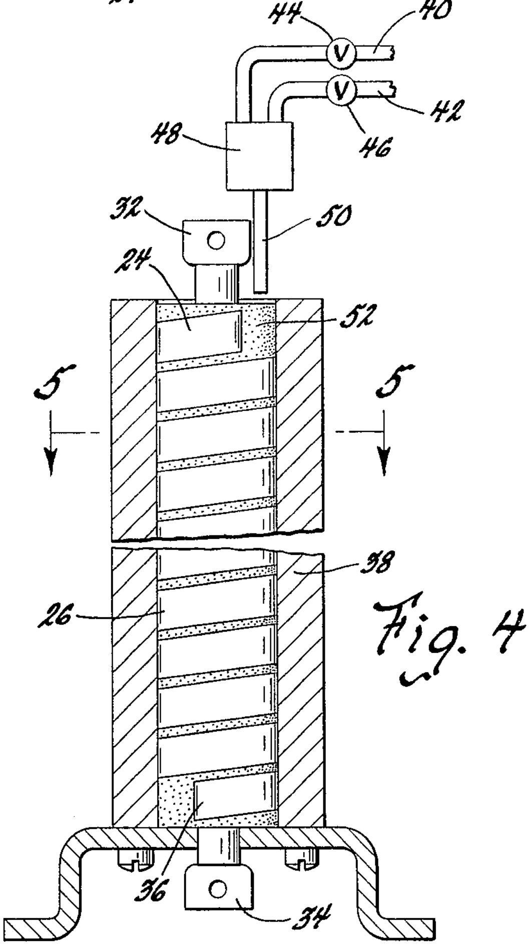
FIGURE 4 is a vertical sectional view of a mold containing the assembly taken along the lines 4—4 of FIGURE 5 illustrating the casting of a plastic and heat insulating foam resin within the assembly.
Figure 5:
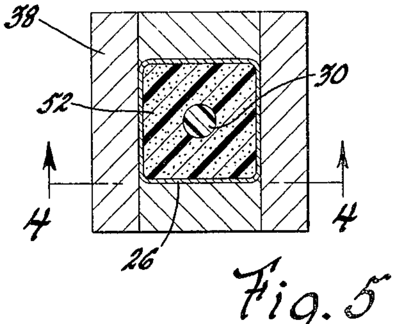
FIGURE 5 is a transverse horizontal sectional view taken along the lines 5—5 of FIGURE 4.

If desired, the foam resin may be cast between the channel pieces 321 and 323, as illustrated in FIGURE 4 or 16, prior to their connection by the thermoelectric material. The thermoelectric material may then be bonded in place between the flanges 325 and 327 on both sides conveniently by the plasma jet process illustrated in FIGURE 9. Following this, the square tubing, thus formed, may be cut on all four sides by the skewed, gang milling process illustrated in FIGURE 11 to provide the continuous cuts in a helical arrangement throughout the tubing like those illustrated in FIGURE 19 so as to provide a continuous strip in a helical arrangement in which the connectors 321 and 323 are alternately connected in series by the "P" and "N" type thermoelectric material 329 and 331. Following this, electrical conductors may be connected by soldering to the opposite ends of the strips so formed as illustrated in FIGURE 20.

The thermoelectric arrays, as illustrated in any one of the forms previously described, may be connected with as many units in series as is desired. For example, as many arrays, such as 60, may be connected in series as is necessary for efficient direct connection to any form of standard power source, such as 120 volts, without resort to transformers or voltage changing apparatus. With a sufficient number of such arrays connected in series, they may be connected directly through rectifiers to an alternating current power source without resort to transformers. For example, an arrangement such as that shown in the Karrer Patent 2,910,836, issued November 3, 1959, may be used.

For the purpose of illustrating one particular application, there is shown in FIGURE 23 an insulated cabinet 420 containing an upper compartment 422 normally intended as a warming compartment and a lower compartment 424 normally intended as a cooling compartment. In between these two compartments is a partition 426 containing at least one of the thermoelectric arrays 143 (FIGURE 12) having the connectors 60 turned uppermost and the connectors 62 turned lowermost. The connectors 60 are in heat transfer relation with the bottom of the compartment 422 while the connectors 62 are in heat transfer relation with the top of the lower compartment 424. The terminals of the thermoelectric array 143 are connected by the conductors 428 and 430 to a set of reversing switches 432 and 434. The inside terminals of the reversing switches 432 and 434 are connected by the conductor 436 through the choke coil 438 to the center tap of a stepdown transformer 440 which is connected to the alternating current supply conductors 442. The outermost contacts of the reversing switches 432 and 434 are connected by the conductor 444 through separate rectifiers 446 and 448 to the opposite end terminals of the secondary coil of the transformer 440. When the reversing switches 432 and 434 are in one position, the current will flow through the thermoelectric array 143 in one direction so as to cool the connectors 62 to cool the compartment 424 and to heat the connectors 60 so as to heat the compartment 422. When the reversing switches 432 and 434 are moved to the opposite position, the current will flow in the reverse direction through the thermoelectric array 143, thereby causing the connectors 62 to be heated to warm the compartment 424 and the connectors 60 to be cooled to cool compartment 422. Thus, an arrangement has been provided whereby some food can be heated and other food cooled simultaneously. Furthermore, the selection can be made so that the larger compartment can be either heated or cooled and the smaller compartment can be either cooled or heated.

While the embodiments of the present invention as herein disclosed constitute preferred forms, it is to be understood that other forms might be adopted.

What is claimed is as follows:

1. A thermoelectric array including a series of "P" type thermoelectric elements extending in spaced relation in a first row causing gaps between the elements as a result of the spaced relation of the elements, a series of "N" type thermoelectric elements extending in spaced relation in a second row which is substantially uniformly spaced from and substantially parallel to the first row of elements, means for connecting said "P" and "N" type elements alternately in series with each other comprising a first series of spaced metal connector elements located on and connecting one side of the "P" and "N" type elements and a second series of spaced metal connector elements located on and connecting the opposite side of the "P" and "N" type elements, at least two of said series of elements being skewed, said series of elements being constructed and arranged to define a substantially hollow tubular configuration, a rod of electrical insulating material extending from end to end within the interior of said hollow tubular configuration of elements, the ends of said rod being provided with first and second electrical terminal means, means for electrically connecting the first electrical terminal means adjacent the first end of said array to the adjacent P-type thermoelectric element at the first end of said array, and means for electrically connecting the second electrical terminal means at the second end of said array to an adjacent N-type thermoelectric element.

2. A thermoelectric array including a series of "P" type thermoelectric elements extending in spaced relation in a first row causing gaps between the elements as a result of the spaced relation of the elements, a series of "N" type thermoelectric elements extending in spaced relation in a second row which is substantially uniformly spaced from and substantially parallel to the first row of elements, means for connecting said "P" and "N" type elements alternately in series with each other comprising a first series of spaced metal connector elements located on and connecting one side of the "P" and "N" type elements and a second series of spaced metal connector elements located on and connecting the opposite side of the "P" and "N" type elements, at least two of said series of elements in the array being skewed, said series of elements being constructed and arranged to define a substantially hollow tubular configuration, a rod of electrical insulating material extending from end to end within the interior of said hollow tubular configuration of elements, the ends of said rod being provided with first and second electrical terminal means, means for connecting the first electrical terminal means at the first end of said rod to the adjacent P-type thermoelectric element, means for electrically connecting the second electrical terminal means at the second end of said rod to the adjacent N-type thermoelectric element, said rod having heat and electrical insulating means extending into contact with and supporting said elements to provide an array having substantial physical strength.

References Cited by the Examiner

UNITED STATES PATENTS

| | | | |
|---|---|---|---|
| 2,278,744 | 4/1942 | Sparrow. | |
| 2,793,420 | 5/1957 | Johnston. | |
| 2,991,627 | 7/1961 | Suits | 62—3 |
| 3,016,715 | 1/1962 | Pietsch | 62—3 |
| 3,126,616 | 3/1964 | Pietsch | 136—5.1 X |

WINSTON A. DOUGLAS, *Primary Examiner.*

W. J. WYE, A. B. CURTIS, *Assistant Examiners.*